United States Patent
Kim et al.

(10) Patent No.: US 8,763,530 B2
(45) Date of Patent: Jul. 1, 2014

(54) INK FOR BLACK MATRIX AND METHOD OF MANUFACTURING SUBSTRATE USING THE SAME

(75) Inventors: Byung-Geol Kim, Goyang-si (KR); Jin-Wuk Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 522 days.

(21) Appl. No.: 12/941,664

(22) Filed: Nov. 8, 2010

(65) Prior Publication Data

US 2011/0290138 A1     Dec. 1, 2011

(30) Foreign Application Priority Data

May 25, 2010   (KR) .................. 10-2010-0048539

(51) Int. Cl.
*H05K 3/12*     (2006.01)
(52) U.S. Cl.
USPC .......................................... 101/491; 101/492
(58) Field of Classification Search
None
See application file for complete search history.

(56) References Cited

U.S. PATENT DOCUMENTS

| | | | |
|---|---|---|---|
| 2008/0134918 A1* | 6/2008 | Yasuda | 101/457 |
| 2008/0178756 A1* | 7/2008 | Nam et al. | 101/217 |
| 2009/0176936 A1* | 7/2009 | Kim et al. | 525/50 |
| 2010/0136301 A1* | 6/2010 | Kim et al. | 428/195.1 |

FOREIGN PATENT DOCUMENTS

| | | |
|---|---|---|
| CN | 101457050 | 6/2009 |
| CN | 101679792 | 3/2010 |
| WO | WO 2009082143 A2 * | 7/2009 |

* cited by examiner

*Primary Examiner* — Joshua D Zimmerman
(74) *Attorney, Agent, or Firm* — McKenna Long & Aldridge LLP

(57) ABSTRACT

An ink used to form a black matrix on a substrate using an off-set printing device, wherein the off-set printing device includes a stage on which the substrate is placed, a printing roll which is covered by a blanket, and a cliché which includes a concave portion and a convex portion, the ink includes: an organic pigment; a binder; a thermally cross-linkable monomer; a printing solvent that has a boiling point equal to or more than 100 degrees Celsius; a carrier solvent that has a boiling point less than 100 degrees Celsius; and an additive.

9 Claims, 6 Drawing Sheets

INK FOR BLACK MATRIX AND METHOD OF MANUFACTURING SUBSTRATE USING THE SAME

The present invention claims the benefit of Korean Patent Application No. 10-2010-0048539, filed in Korea on May 25, 2010, which is hereby incorporated by reference for all purposes as if fully set forth herein.

BACKGROUND OF THE INVENTION

1. Field of the Invention

The present invention relates to a liquid crystal display device, and more particularly, to an ink for a black matrix and a method of manufacturing a substrate using the same.

2. Discussion of the Related Art

Until recently, display devices have typically used cathode-ray tubes (CRTs). Presently, many efforts and studies are being made to develop various types of flat panel displays, such as liquid crystal display (LCD) devices, plasma display panels (PDPs), field emission displays, and electro-luminescence displays (ELDs), as a substitute for CRTs. Of these flat panel displays, LCD devices have many advantages, such as high resolution, light weight, thin profile, compact size, and low voltage power supply requirements.

In general, an LCD device includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field into the direction of the induced electric field, thereby changing the light transmissivity of the LCD device. Thus, the LCD device displays images by varying the intensity of the induced electric field.

FIG. 1 is a perspective view illustrating an LCD device according to the related art.

Referring to FIG. 1, the LCD device includes an array substrate 10, a color filter substrate 20 and a liquid crystal layer 30 between the array substrate 10 and the color filter substrate 20.

The array substrate 10 includes gate and data lines 14 and 16 crossing each other on a first substrate 12 to define a pixel region P. A thin film transistor Tr is formed at a crossing portion of the gate and data lines 14 and 16. A pixel electrode 18 in the pixel region P is connected to the thin film transistor Tr.

The color filter substrate 20 includes a black matrix 25 on a second substrate 22 and corresponding to the gate and data lines 14 and 16 and the thin film transistor Tr. A color filter layer 26 corresponds to the pixel region P. The color filter layer 26 includes red (R), green (G) and blue (B) color filter patterns 26a, 26b and 26c corresponding to the respective pixel regions P. A common electrode 28 is formed on the black matrix 25 and the color filter layer 26.

Although not shown in the drawings, a sealant is formed along peripheral portions of the array substrate 10 and the color filter substrate 20 to attach the array substrate 10 and the color filter substrate 20. Alignment layers to align liquid crystal molecules of the liquid crystal layer 30 are formed at the array substrate 10 and the color filter substrates, respectively. Polarizing plates are formed on outer surfaces of the array substrate 10 and the color filter substrate 20, respectively. A backlight unit is below the array substrate 10 to supply light.

When a gate signal is supplied to the gate line 14, the thin film transistor Tr is turned on and a data signal is supplied through the data line 16 to the pixel electrode 18. Accordingly, an electric field is induced between the pixel electrode 16 and the common electrode 28, and images are displayed through the LCD device.

The LCD device is manufactured through a plurality of mask processes to form the thin film transistor Tr, the gate and data lines 14 and 16 and the like at the array substrate 10, and the black matrix 25, the color filter patterns 26a to 26c and the like at the color filter substrate 20. Each mask process includes many steps, such as a step of forming a material layer on a substrate, a step of forming a photoresist layer on the material layer, a step of exposing the photoresist layer to light using a photo mask, a step of developing the light-exposed photoresist layer to form a photoresist pattern, a step of etching the material layer using the photoresist pattern as an etching mask, a step of stripping the photoresist pattern, and the like.

Accordingly, when a number of mask processes increases, production costs and time for the LCD device increase.

The related art requires many mask processes. In other words, four or five mask processes are required to manufacture the array substrate, and four mask processes are required to manufacture the color filter substrate. Accordingly, it is needed to reduce a number of mask processes.

SUMMARY OF THE INVENTION

Accordingly, the present invention is directed to an ink for a black matrix and a method of manufacturing a substrate for a liquid crystal display device using the same which substantially obviates one or more of the problems due to limitations and disadvantages of the related art.

An advantage of the present invention is to provide an ink for a black matrix and a method of manufacturing a substrate for a liquid crystal display device using the same that can reduce production costs and time and improve production efficiency.

Additional features and advantages of the present invention will be set forth in the description which follows, and in part will be apparent from the description, or may be learned by practice of the invention. These and other advantages of the invention will be realized and attained by the structure particularly pointed out in the written description and claims thereof as well as the appended drawings.

To achieve these and other advantages and in accordance with the purpose of the present invention, as embodied and broadly described herein, an ink used to form a black matrix on a substrate using an off-set printing device, wherein the off-set printing device includes a stage on which the substrate is placed, a printing roll which is covered by a blanket, and a cliché which includes a concave portion and a convex portion, the ink includes: an organic pigment; a binder; a thermally cross-linkable monomer; a printing solvent that has a boiling point equal to or more than 100 degrees Celsius; a carrier solvent that has a boiling point less than 100 degrees Celsius; and an additive.

In another aspect, a method of manufacturing a substrate for a liquid crystal display device, the method includes: placing a substrate on a stage of an off-set printing device, wherein the off-set printing device includes the stage, a printing roll which is covered by a blanket, and a cliché which includes a concave portion and a convex portion; coating the blanket with an ink in liquid state, thereby forming an black ink layer in gel state on the blanket; performing an off printing process to make contact between the cliché and the black ink layer in gel state and transfer a portion of the black ink layer onto the cliché, thereby forming a black ink pattern on the blanket; performing a set printing process to transfer the black ink pattern onto the substrate; and performing a firing process for the substrate having the black ink pattern to harden the black ink pattern, thereby forming a black matrix having a lattice pattern that includes a plurality of openings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
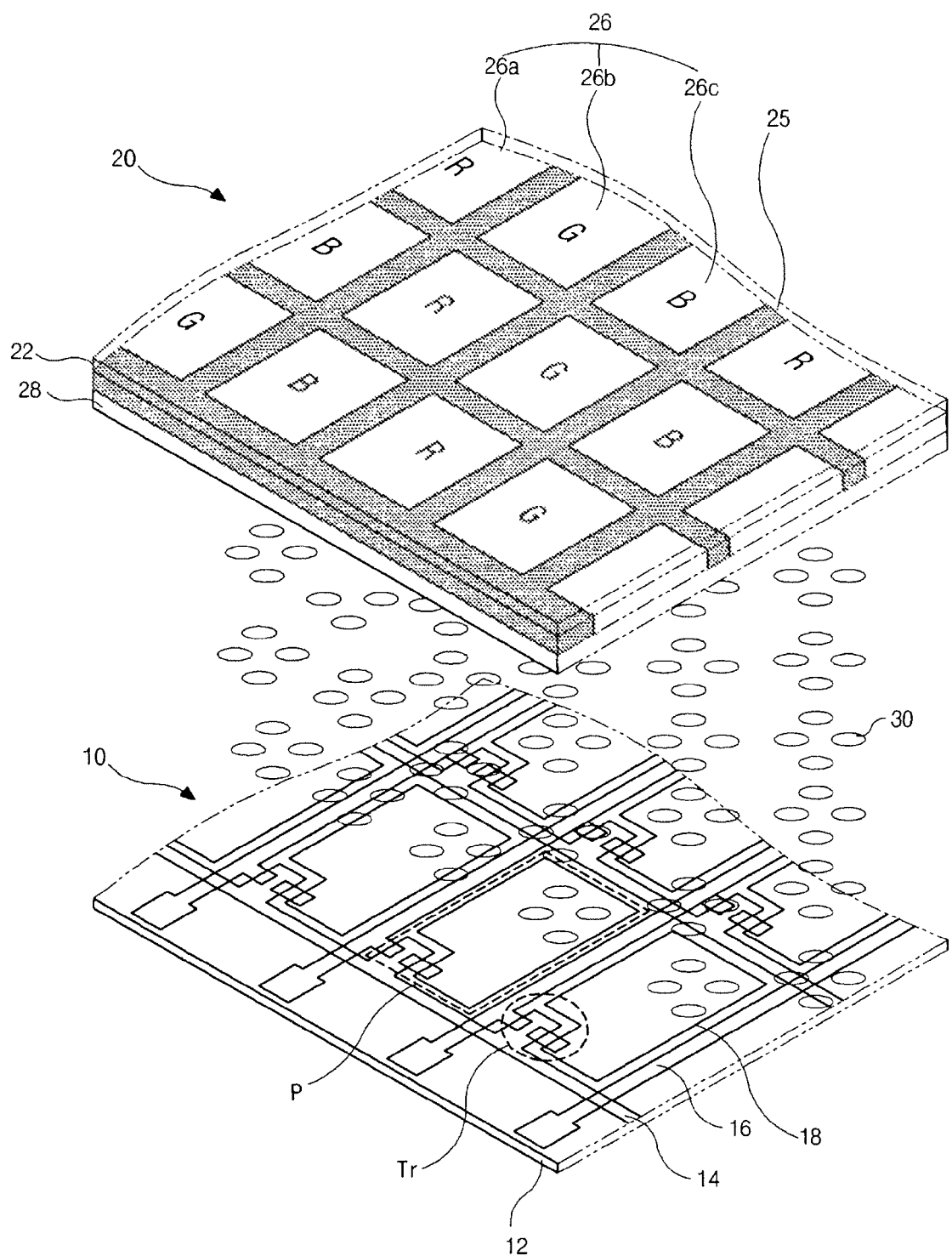
FIG. 1 is a perspective view illustrating an LCD device according to the related art.

Reference will now be made in detail to the illustrated embodiments of the present invention, which are illustrated in the accompanying drawings.

In an LCD device of an embodiment of the present invention, a black matrix is formed through an off-set printing method using a printing device, and thus a mask process to form the black matrix is not needed. Accordingly, production costs and time can be reduced, and production efficiency can be improved.

To form the black matrix with the off-set printing method, an ink, which includes specific ingredients suitable for ink-printing and ink-coating, is required. Such the ink is described in detail as follows.

The ink for the black matrix may include an organic pigment, a binder, a thermally cross-linkable monomer, a printing solvent that has a high boiling point equal to or higher than about 100 degrees Celsius (° C.) a carrier solvent that has a low boiling point lower than about 100 degrees Celsius (° C.) and an additive.

It is preferred that the ink is kept in liquid state of viscosity when coating a blanket, which covers a printing roll of the printing device with the ink, and the ink is kept in gel state during a period, that may be from a predetermined time after coating the blanket with the ink, including a time of printing the ink on plates e.g., a cliché and a substrate, until a process of hardening the ink is performed. The period in gel state may be about 30 seconds to about 60 seconds.

Further, it is preferred that the ink has a surface energy greater than the blanket and less than the cliché and the substrate.

The blanket may be made of a silicon rubber material, for example, PDMS (poly-dimethyl siloxane) and thus have a surface energy less than about 20 mJ/m$^2$. The cliché and substrate may be made of a metal, glass or plastic material and thus have a surface energy greater than about 50 mJ/m$^2$.

Accordingly, it is preferred that the ink has a surface energy of about 20 mJ/m$^2$ to about 50 mJ/m$^2$. It is more preferred that the ink has a surface energy of about 25 mJ/m$^2$ to about 40 mJ/m$^2$.

When the ink has a surface energy less than the blanket and greater than the cliché and the substrate, ink-transferring is degraded so that the ink is not transferred onto the cliché and the substrate or the ink is not uniformly transferred. To prevent this, the ink has the surface energy as described above.

It is preferred that the ink includes about 45% to about 55% by weight of the organic pigment, about 5% to about 10% by weight of the binder, about 2% to about 5% by weight of the thermally cross-linkable monomer, about 30% to about 50% by weight of the carrier solvent, about 2% to about 10% by weight of the printing solvent, and about 2% to about 5% by weight of the additive.

The organic pigment may have an optical density equal to or greater than 4 to substantially prevent light transmission. To do this, for example, the organic pigment may include carbon black.

The binder functions to form a film on a substrate. For example, the binder may include a high molecular weight polymer having a molecular weight of about 10000 to 25000, for example, an acrylate material.

The thermally cross-linkable monomer may include pentaerythritol triacrylate containing vinyl group. The thermally cross-linkable monomer improves adhesion to a substrate and is thermally hardened and thus functions to maintain a specific shape.

It is preferred that the carrier solvent is a solvent, which has a low flash point and a low boiling point below 100 degrees Celsius, has a high solubility, and has a low absorptiveness, for example, methanol or ethanol.

It is preferred that the printing solvent is a solvent, which has a high flash point and a high boiling point, and has a dispersion term greater than a polar term among solubility parameters, for example, propylene carbonate, ethylene glycol, tetraethylene glycol, tripropylene glycol, or glycerol. Because the dispersion term is greater than the polar term, dispersion stability of the organic pigment can be obtained.

The additive may include at least one of silicon surfactant and dispersion improver such as polyester resin.

As described above, weight (wt) % of the printing solvent is set to be about 5% or less. When wt % of the printing solvent is over 5%, absorptiveness of the blanket increases thus the blanket entirely absorbs the printing solvent and ink-printing is degraded. Accordingly, it is desired that the printing solvent has the wt % as described above.

After the ink is printed in a specific pattern on the substrate then a hardening process is completed, most of the printing solvent and the carrier solvent are volatilized and removed from the ink. Accordingly, the organic pigment, the thermally cross-linkable monomer and the binder finally remain as main ingredients on the substrate and form a black matrix.

As a comparative example, a material for a black matrix, which is formed on a substrate through a mask process, generally includes an organic pigment, a binder, a photo cross-linkable monomer, a photo cross-linking initiator, a solvent and an additive. When the comparative black matrix material is printed on a substrate using the off-set printing method of the embodiment, a problem, such as the black matrix material being absorbed by the blanket, occurs, and thus, material-coating is degraded and material-transferring from a printing roll onto the cliché is degraded. Accordingly, a desired pattern is not made on the blanket, and thus a black matrix having a desired pattern is not formed on the substrate.

To perform the off-set printing method of the embodiment, an entire surface of the blanket is required to be coated in uniform thickness with a material. However, the comparative black matrix material is suitable for a mask process. Accordingly, even though the comparative black matrix material has good capability of coating a substrate, it is shown in experiment that the comparative black matrix has relatively less capability of coating the blanket made of PDMS.

Further, a material is required to be kept in gel state when it stays on the blanket after coating the blanket. This makes pressure uniformly applied when contacting the cliché, thus the material is not transferred to a concave portion of the cliché but transferred to a convex portion of the cliché, and thus the material remains in a specific pattern on the blanket. However, the comparative black matrix material is not kept in gel state or is kept in gel state very short time, and thus a desired pattern is not formed on the blanket for an off-printing process of the off-set printing method.

However, in case of the ink of the embodiment, by action of dual solvents i.e., the carrier solvent and the printing solvent, state of the ink solution is well kept when coating the blanket, and thus ink-coating is effectively performed. Further, the ink is kept in gel state on the blanket after coating the blanket, the off-printing process is performed such that the ink i.e., a black matrix layer in gel state contacts the cliché, and a black matrix pattern in gel state is formed in a desired pattern on the blanket.

Further, when a set-printing process of the off-set printing method is performed to transfer the black matrix pattern in gel state onto the substrate, the black matrix pattern is transferred as effectively as desired. Accordingly, through a following thermal treatment, a black matrix having a desired pattern is finally formed.

Figure 2:
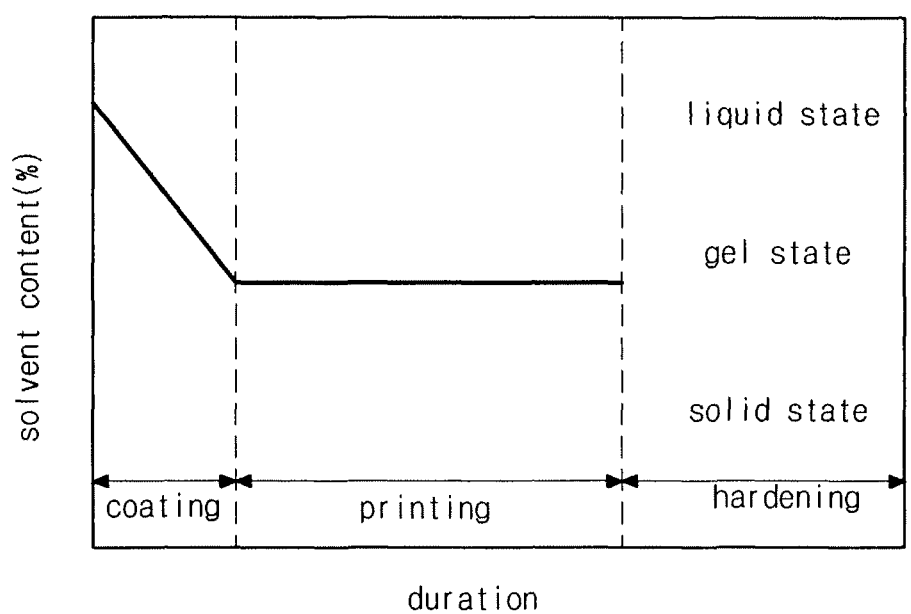
FIG. 2 is a graph illustrating states, according to duration of the off-set printing process, of the ink according to the embodiment of the present invention.

FIG. 2 is a graph illustrating states, according to duration of the off-set printing process, of the ink according to the embodiment of the present invention.

Referring to FIG. 2, the ink is initially in liquid state, then is volatilized during the coating process, then becomes in gel state at a time of the coating completion, and then the gel state is maintained until the hardening process.

As described above, the gel state is kept long time. Accordingly, a step of patterning the ink through contact between the blanket and the cliché and a step of transferring the patterned ink onto the substrate through contact of the blanket and the substrate can be performed in gel state of the ink. Therefore, the black matrix can be stably formed on the substrate.

A method of manufacturing a color filter substrate using the ink according to the embodiment is described as follows.

FIGS. 3A to 3H are cross-sectional views illustrating a method of manufacturing a color filter substrate according to the embodiment of the present invention.

Figure 3A:
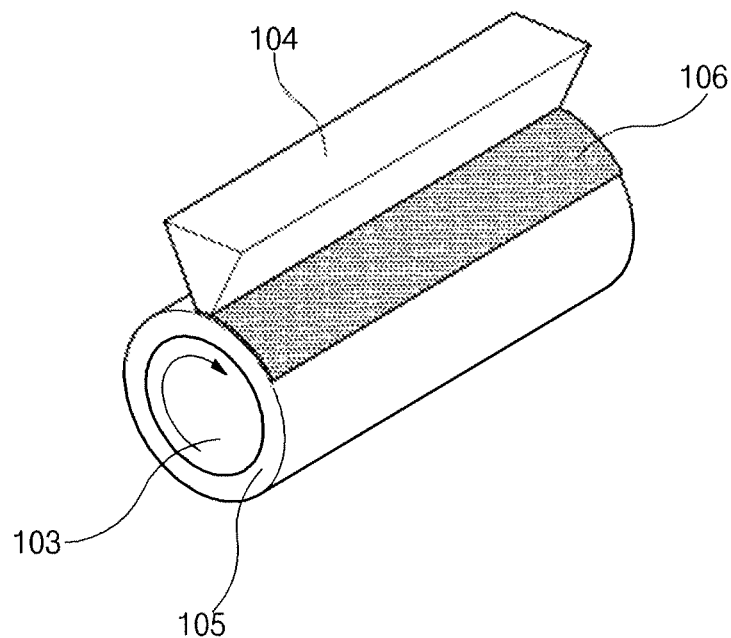
FIGS. 3A to 3H are cross-sectional views illustrating a method of manufacturing a color filter substrate according to the embodiment of the present invention.

Referring to FIG. 3A, prepared is a printing device that may include a stage (110 of FIG. 3C) on which a substrate (101 of FIG. 3C) is placed on, a printing roll 103 rolled up in a blanket 105, an ink supply slit 104 which supplies an ink for a black matrix to the blanket 105 to coat the blanket 105 with the ink, and a cliché 107. The composition of the ink is described above.

The blanket 105 is rotated along a direction and the ink supply slit 104 drops the ink, and the blanket 105 is thus coated with the ink. Accordingly, an ink layer 106 having a predetermined thickness is uniformly formed on an entire surface of the blanket 105.

Figure 3B:
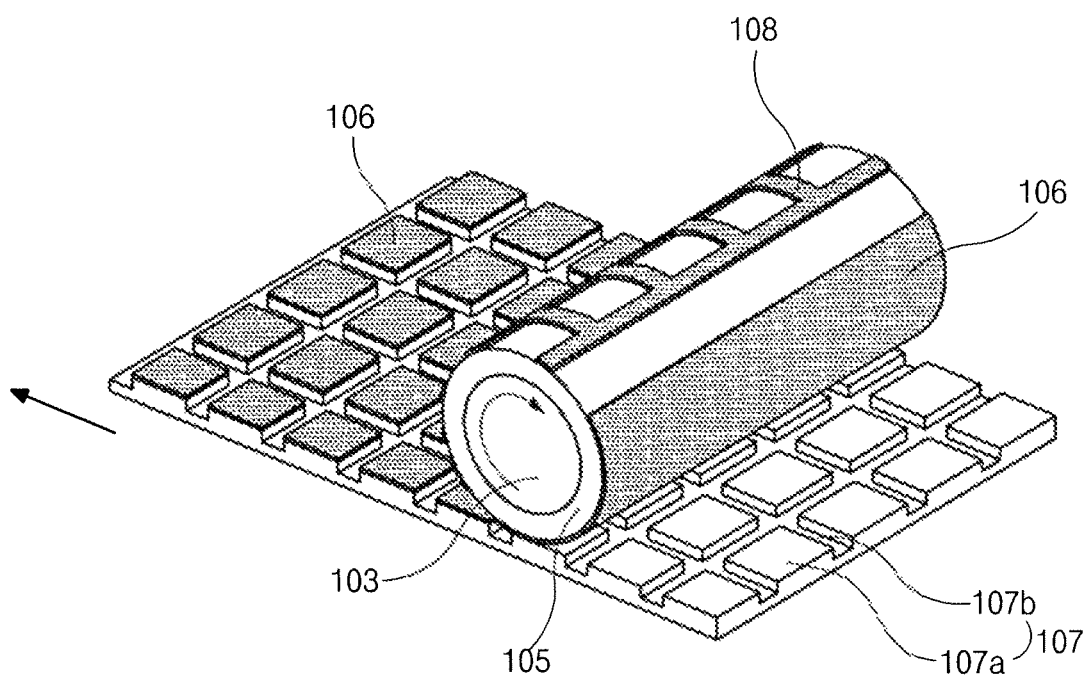

Referring to FIG. 3B, the blanket 105 contacts an end portion of the cliché 107. Then, the cliché 107 moves in a direction relatively to the blanket 105, and simultaneously, the printing roll 103 is rotated according to the moving speed of the cliché 107. Accordingly, the ink layer 106 is partially removed and has a patterned shape. The process of making contact between the printing roll 103 having the blanket 105 and the cliché 107 and patterning the ink layer 106 in a specific pattern may be referred to as an off printing process.

The cliché 107 includes a convex portion 107a and a concave portion 107b. When the ink layer 106 contacts the cliché 107, a portion of the ink layer 106 corresponding to the convex portion 107a is transferred to the cliché 107. Through the off printing process, a portion of the ink layer 106 corresponding to the concave portion 107b remains on the blanket 105. Accordingly, the ink layer 106 has substantially the same pattern as the concave portion 107b, and this ink layer 106 may be referred to as a first black pattern 108. Further, the pattern of the concave portion 107b is substantially the same as a pattern of a black matrix which is formed on the substrate 101 in a following process.

Since the ink includes the composition as described above, the surface energy of the ink is greater than that of the blanket 105 and less than those of the cliché 107 and the substrate 101. For example, the surface energy of the ink is about 25 mJ/m$^2$ to about 40 mJ/m$^2$. Accordingly, since the ink is in gel state after coating the blanket 105, when the ink layer 106 contacts the cliché 107, transferring the ink layer 106 from the blanket 105 into the cliché 107 can be effectively performed without defects.

Figure 3C:
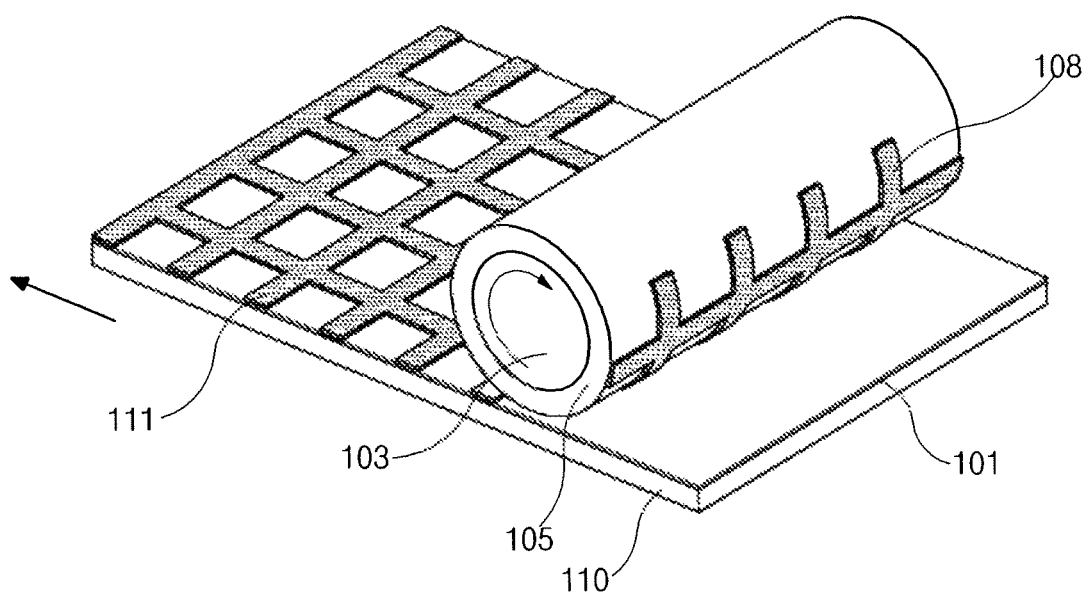

Referring to FIG. 3C, the blanket 105 having the first pattern 108 thereon contacts an end portion of the substrate 101 which is placed on the stage 110. Then, the substrate 101 moves in a direction relatively to the blanket 105, and simultaneously, the printing roll 103 is rotated according to the moving of the substrate 101. Accordingly, the first black pattern 108 remaining on the blanket 105 is transferred onto the substrate 101. In the process, the first black pattern 108 is still kept in gel state. Accordingly, transferring the first black pattern 108 onto the substrate 101 can be effectively performed without defects. The process of transferring the first black pattern 108 on the blanket 105 into the substrate 101 may be referred to as a set printing process.

Through the set printing, the first black pattern 108 is printed on the substrate 101, and the printed first black pattern 108 on the substrate 101 may be referred to as a second black pattern 111.

Figure 3D:
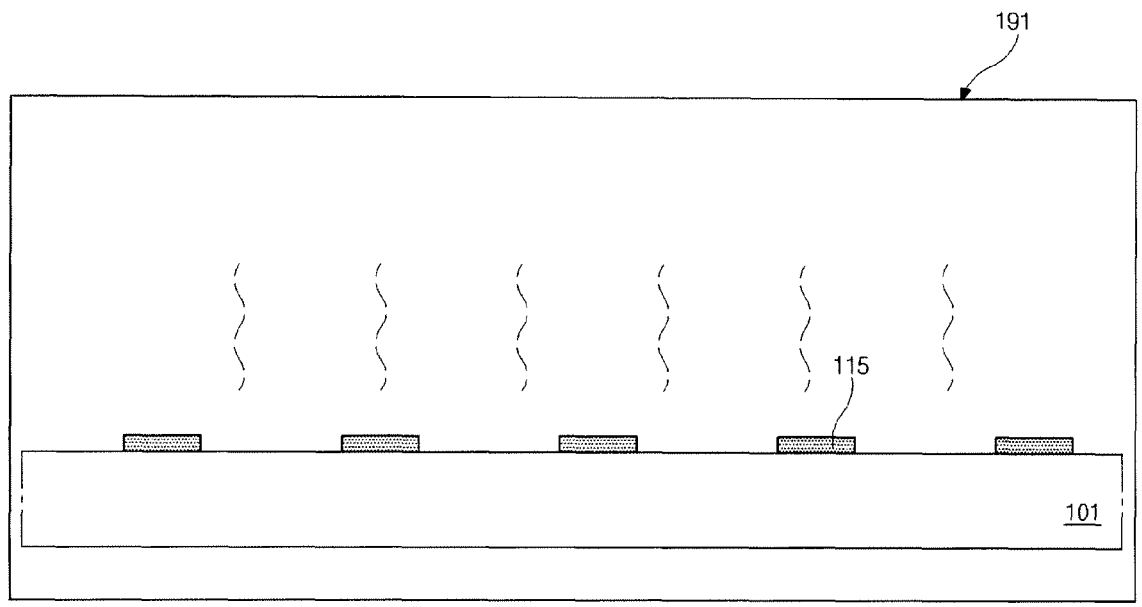

Referring to FIG. 3D, the substrate 101 having the second black pattern 111 is placed in a firing device 191, for example, a furnace or oven. The substrate 101 is exposed to a high temperature condition, for example, about 300 degrees Celsius to about 370 degrees Celsius for about 1 minute to about 20 minutes. Accordingly, the second black pattern 111 is hardened so that the black matrix 115 is finally formed. Due to the firing process, the black matrix 115 has the black organic pigment, the binder, the thermally cross-linkable monomer and the additive as main ingredients. The black matrix 115 has the same pattern as the concave portion 117b of the cliché 117 and includes an opening portion corresponding to the convex portion 117a of the cliché 117. For example, the black matrix 115 has a lattice pattern. The black matrix 115 corresponds to a peripheral region between pixel regions, and the opening portion of the black matrix 115 corresponds to the pixel region.

As described above, the black matrix 115 can be formed by the on and off printing processes without a mask process. Accordingly, an LCD device can be manufactured in one less mask process than the related art LCD device.

Figure 3E:
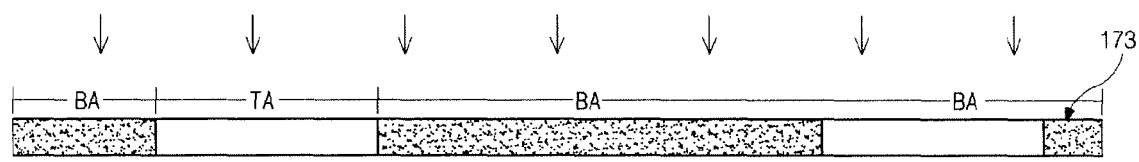
Figure 3E:
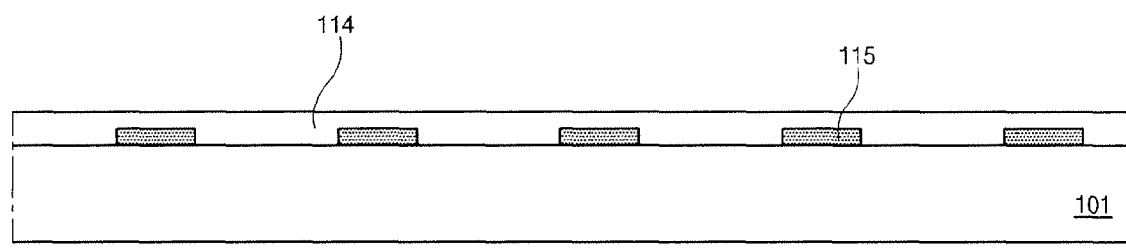

Referring to FIG. 3E, the substrate 101 having the black matrix 115 is coated with a red color resist to form a red color resist layer 114. A photo mask 173 including a transmissive portion TA and a blocking portion BA is disposed over the red color resist layer 114, and a light exposure process is performed.

Figure 3F:
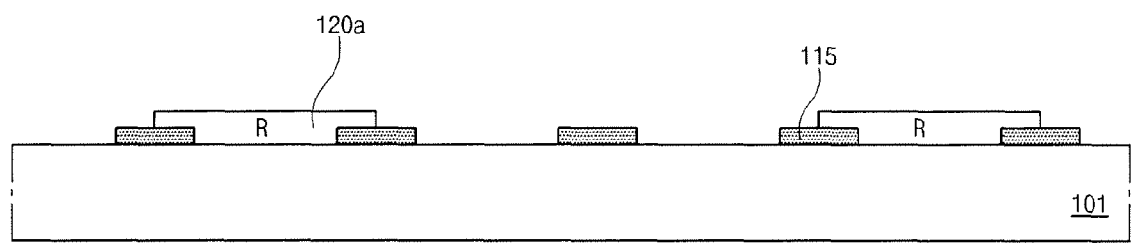

Referring to FIG. 3F, a developing process is performed for the light-exposed red color resist layer 114 to form a red color filter pattern 120a filling the opening portion of the black matrix 115. The red (R) color filter pattern 120a may overlap the black matrix 115. The red (R) color filter pattern 120a is formed corresponding to each of red pixel regions.

Figure 3G:
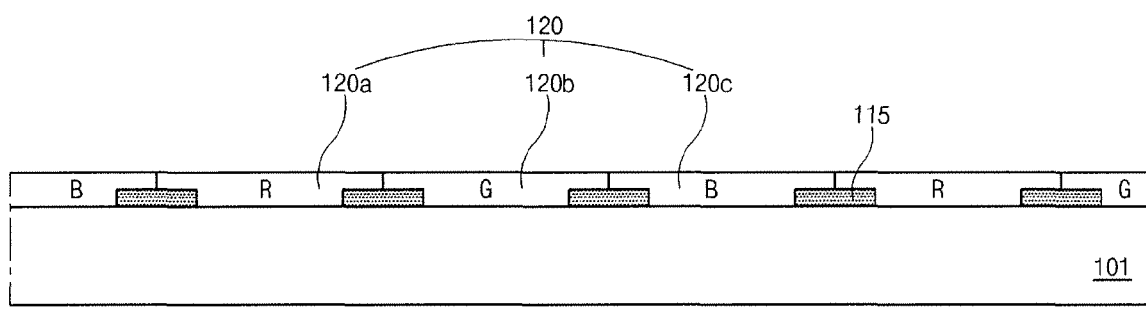

Referring to FIG. 3G, in similar manner to the above process of forming the red color filter pattern 120a, green (G) and blue (B) color filter patterns 120b and 120c are each formed corresponding to green and blue pixel regions by forming and patterning green and blue color resist layers.

Through the above processes, a color filter layer 120 including the red (R), green (G) and blue (B) color filter patterns 120a, 120b and 120c, which correspond to the respective pixel regions, is formed on the substrate 101 having the black matrix 115.

Figure 3H:
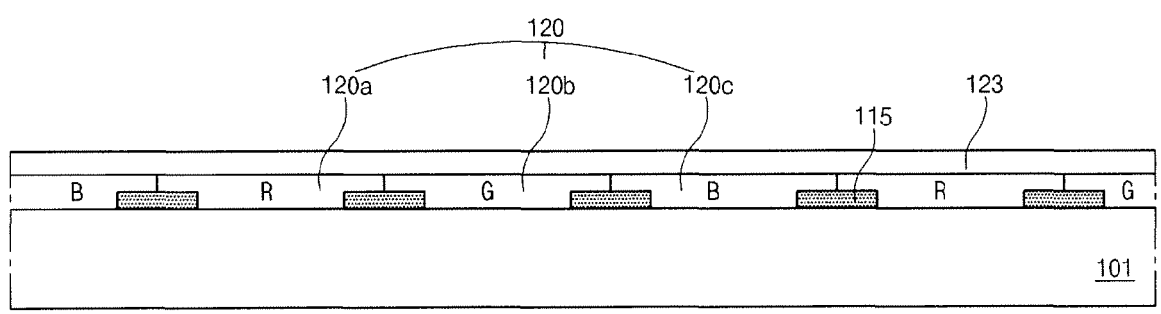

Referring to FIG. 3H, an overcoat layer 123 is formed on the color filter layer 120. The overcoat layer 123 functions to protect the color filter layer 120 and planarize the color filter substrate.

Through the above processes, the color filter substrate can be manufactured. Alternatively, the color filter substrate may include a common electrode, which may be formed on the color filter layer 120 instead of the overcoat layer 123 or formed on the overcoat layer 123. The common electrode may be made of a transparent conductive material, for example, indium-tin-oxide (ITO), indium-zinc-oxide (IZO) or indium-tin-zinc-oxide (ITZO).

In the case that the color filter substrate does not include the common electrode, a common electrode is formed at an array substrate that includes a pixel electrode to form an electric field with the common electrode, a thin film transistor, data and gate lines, and the like. This type of color filter substrate and the array substrate are coupled to form an LCD device, for example, an in-plane switching (IPS) type LCD device.

In the case that the color filter substrate includes the common electrode, this type of color filter substrate and an array substrate, which includes a pixel electrode to form an electric field with the common electrode, a thin film transistor, data and gate lines, and the like, are coupled to form an LCD device, for example, a twisted-nematic (TN) type LCD device.

In the above embodiment, the color filter layer 120 including the red, green and blue color filter patterns 120a, 120b and 120c is formed in three mask processes. Alternatively, the red, green and blue color filter patterns 120a, 120b and 120c may be formed through ink-jet printing methods using an ink jet device, and in this case, the color filter layer 120 may be formed without mask processes.

In the above embodiment, the black matrix 115 is formed at the color filter substrate. Alternatively, the black matrix 115 may be formed at the array substrate using the off-set printing method.

As described above, the ink for the black matrix of the embodiment has the specific composition such that the states of the ink in the coating and in the off-set printing are different to improve ink-coating property and ink-transferring property. Accordingly, printing defect can be prevented.

Accordingly, the black matrix can be effectively formed using a printing method without a mask process. Therefore, production costs and time can be reduced, and production efficiency can be improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of manufacturing a substrate for a liquid crystal display device, the method comprising:
    placing a substrate on a stage of an off-set printing device, wherein the off-set printing device includes the stage, a printing roll which is covered by a blanket, and a cliché which includes a concave portion and a convex portion;
    coating the blanket with an ink in liquid state, thereby forming a black ink layer in gel state on the blanket;
    contacting the cliché and the black ink layer in gel state and transferring a portion of the black ink layer onto the cliché, thereby forming a black ink pattern on the blanket;
    transferring the black ink pattern onto the substrate; and
    performing a firing process for the substrate having the black ink pattern to harden the black ink pattern, thereby forming a black matrix having a lattice pattern that includes a plurality of openings,
    wherein the ink includes a carrier solvent and a printing solvent; and
    wherein the ink has a surface energy greater than the blanket and less than the cliché and the substrate, and a concentration of the carrier solvent in the ink is in a range of about 30 wt % to about 50 wt % and a concentration of the printing solvent in the ink is in a range of about 2 wt % to about 10 wt %.

2. The method according to claim 1, further comprising forming a color filter layer that includes red, green and blue color filter patterns which fill the respective openings and overlap the black matrix.

3. The method according to claim 2, further comprising an overcoat layer that has an even surface, or a transparent electrode that is made of a transparent conductive material, on the color filter layer.

4. The method according to claim 1, wherein the ink further includes:
    an organic pigment;
    a binder;
    a thermally cross-linkable monomer; and
    an additive;
        wherein the printing solvent has a boiling point equal to or more than 100 degrees Celsius and the carrier solvent has a boiling point less than 100 degrees Celsius.

5. The method according to claim 4, wherein a concentration of the organic pigment is in a range of about 45 wt % to about 55 wt %, a concentration of the binder is in a range of about 5 wt % to about 10 wt %, a concentration of the thermally cross-linkable monomer is in a range of about 2 wt % to about 5 wt %, and a concentration of the additive is in a range of 2 wt % to about 5 wt %.

6. The method according to claim 4, wherein the printing solvent has a dispersion term greater than a polar term.

7. The method according to claim 6, wherein the printing solvent is one of propylene carbonate, ethylene glycol, tetraethylene glycol, tripropylene glycol, and glycerol.

8. The method according to claim 4, wherein the carrier solvent is one of methyl ethyl ketone, methanol and ethanol.

9. The method according to claim 4, wherein the organic pigment is carbon black, the binder is an acrylate high molecular weight polymer that has a molecular weight of about 10000 to about 25000, the thermally cross-linkable monomer is pentaerythritol triacrylate that includes a vinyl group, and the additive includes a silicon surfactant and a dispersion improver of polyester resin.

* * * * *